United States Patent [19]
Min

[11] Patent Number: 6,055,412
[45] Date of Patent: Apr. 25, 2000

[54] RADIO PAGING RECEIVER CAPABLE OF RECEIVING FACSIMILE DATA AND METHOD FOR CONTROLLING THE SAME

[75] Inventor: Yong-Gi Min, Suwon, Rep. of Korea

[73] Assignee: Samsung Electronics Co., Ltd., Rep. of Korea

[21] Appl. No.: 08/991,627

[22] Filed: Aug. 29, 1997

[30] Foreign Application Priority Data

Sep. 2, 1996 [KR] Rep. of Korea ............... 96-37917

[51] Int. Cl.⁷ ........................................ H04B 7/00

[52] U.S. Cl. ................. 455/38.1; 455/32.1; 455/38.4; 340/825.44; 345/123; 358/400

[58] Field of Search ................. 455/31.1, 31.2, 455/31.3, 32.1, 38.4, 38.1, 38.5, 426, 575; 340/825.44, 311.1; 345/341, 121, 123, 124, 125; 379/100.01; 358/400

[56] References Cited

U.S. PATENT DOCUMENTS

| | | | |
|---|---|---|---|
| 4,602,251 | 7/1986 | Sawada et al. | 340/724 |
| 5,392,136 | 2/1995 | Nobuta et al. | 358/444 |
| 5,422,733 | 6/1995 | Merchant et al. | 358/407 |
| 5,430,436 | 7/1995 | Fennell | 340/825.44 |
| 5,495,344 | 2/1996 | Callaway, Jr. et al. | 358/407 |
| 5,757,279 | 5/1998 | Fujiwara | 340/825.44 |

*Primary Examiner*—Doris H. To
*Attorney, Agent, or Firm*—Dilworth & Barrese

[57] ABSTRACT

A radio paging receiver capable of receiving facsimile data transmitted from a calling facsimile via a radio paging network. The radio paging receiver includes a code detector for detecting a synchronization signal, block information, an address signal, vector data, and a message from a received radio paging signal; a memory for storing image data; a display for displaying the image data stored in the memory; means for scrolling the image data displayed on the display; and a controller for controlling the display of the image data.

13 Claims, 6 Drawing Sheets

RADIO PAGING RECEIVER CAPABLE OF RECEIVING FACSIMILE DATA AND METHOD FOR CONTROLLING THE SAME

BACKGROUND OF THE INVENTION

1. Field of the Invention

The present invention relates to a radio communication system, and more particularly to a radio paging receiver capable of receiving facsimile data via a radio communication network and a method for controlling the same.

2. Description of the Related Art

A radio paging service is commonly provided at a speed of 1200 bps by using a POCSAG (Post Office Standardization Advisory Group) code which is a signal format for a radio paging system commonly used in the world and is specified in detail in CCIR (Comite Consultatif International des Radio Communication; International Radio Consultative Committee) Recommendation 584. However, when there is a great deal of information to transmit, the service speed is lowered due to a long air-time, i.e., a long time occupied by a public network, so that the radio paging system may accommodate less subscribers. Conventionally, the radio paging system transmits literal information only, since the literal information can be easily transmitted by the code unit. That is, since the total letters that a radio paging system should express is limited in number, the literal information can be easily expressed by using the code.

Referring to FIG. 1, there is illustrated a conventional radio paging system. As illustrated, a user may dial a phone number for a radio paging receiver 60 by using a telephone set 10, to leave a phone number or a voice message at a radio paging switching network 40 via a public switching network 30. Then, the radio paging switching network 40 pages the radio paging receiver 60 via a base station 50.

However, for example, if one desires to receive facsimile data but cannot find a facsimile machine nearby, the facsimile data cannot be received. Therefore, there is a demand for a radio paging receiver that can receive brief facsimile data, such as brief literal data.

SUMMARY OF THE INVENTION

It is therefore an object of the present invention to provide a radio paging receiver capable of receiving facsimile data and a method for controlling the same.

According to an aspect of the present invention, a radio paging receiver capable of receiving facsimile data includes: a code detector for detecting a synchronization signal, block information, an address signal, vector data, and a message from a received radio paging signal; a memory for storing image data; a display for displaying the image data stored in the memory; means for scrolling the image data displayed on the display; and a controller for receiving the synchronization signal, the block information, the address signal, the vector data, and the message, checking a type of the message to store the image data if the message is the image data, calculating a moving position of first and second output pointers in response to a signal input from the scrolling means, and reading the image data corresponding to the calculated moving position to display the read image data on the display.

BRIEF DESCRIPTION OF THE DRAWINGS

The above and other objects, features and advantages of the present invention will become more apparent in the light of the following detailed description of an exemplary embodiment thereof taken with the attached drawings in which.

DETAILED DESCRIPTION OF PREFERRED EMBODIMENTS

Figure 1:
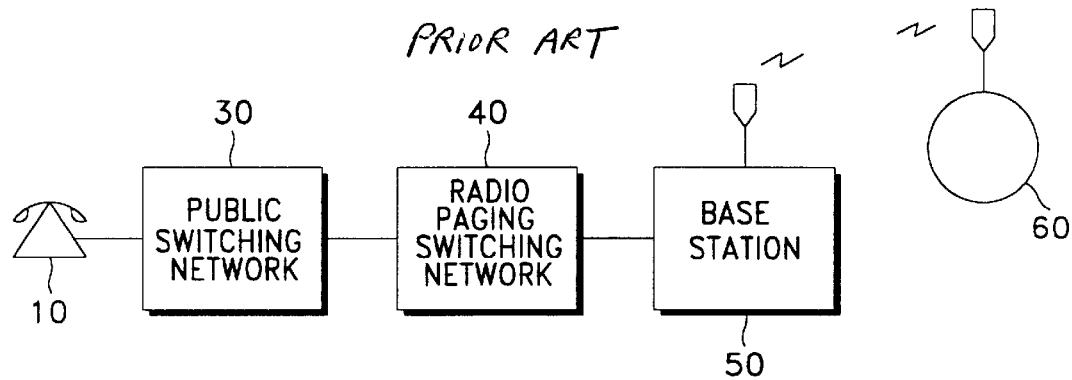
FIG. 1 is a block diagram of a conventional radio paging system.

A preferred embodiment of the present invention will be described in detail hereinbelow with reference to the attached drawings, in which the like reference numerals represent the like elements. Further, it should be clearly understood that many specifics such as the detailed circuit elements are shown only by way of an example to bring a better understanding of the present invention and the present invention may be embodied without those specifics. Moreover, it should be noted that detailed descriptions on the related prior art may be intentionally omitted if it is believed to be unnecessary in describing the concepts of the present invention.

Figure 2:
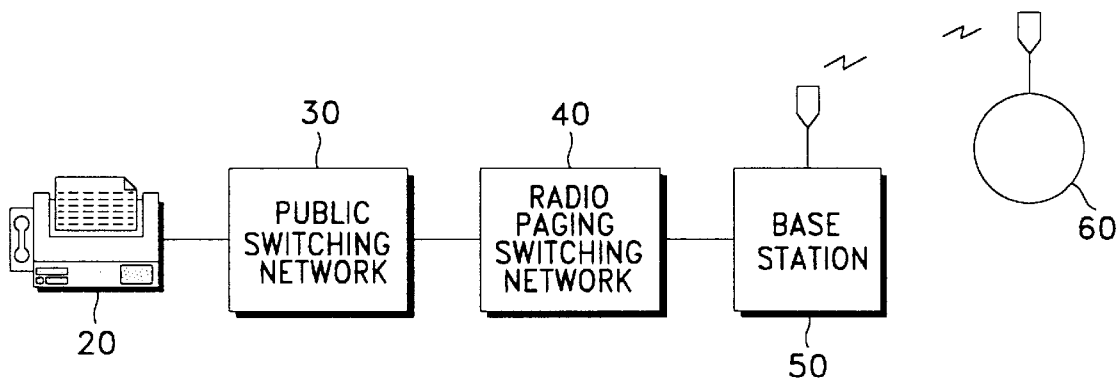
FIG. 2 is a block diagram of a radio paging system for receiving facsimile data via a radio paging network according to an embodiment of the present invention.

Referring to FIG. 2, there is illustrated a radio paging receiver for receiving facsimile data via a radio paging network. As illustrated, if a user of a facsimile 20 dials a phone number for a called facsimile, the facsimile 20 will transmit facsimile data to a radio paging switching network 40 via a public switching network 30. Then, the radio paging switching network 40 pages a radio paging receiver 60 to transmit the facsimile data. Here, the public switching network 30 includes an address table having inherent addresses of the respective radio paging receivers corresponding to the phone numbers for the respective facsimiles. Thus, the public switching network 30 provides a facsimile communication service only to the facsimiles of which the inherent addresses are registered in the public switching network 30. Alternatively, the user of the facsimile 20 may dial a phone number for the radio paging receiver together when dialing the phone number for the called subscriber, or may dial only the phone number for the radio paging receiver if it is known that the user of the radio paging receiver is travelling from place to place.

Generally, a facsimile operates in G3 mode at 9600 bps. Therefore, the facsimile data that the radio paging switching network 40 has received at 9600 bps is converted so as to be transferred to the base station 50 at 6400 bps. Then, the base station 50 codes the facsimile data into a high-speed protocol, i.e., a high-speed radio paging code, to transmit through air.

Figure 3:
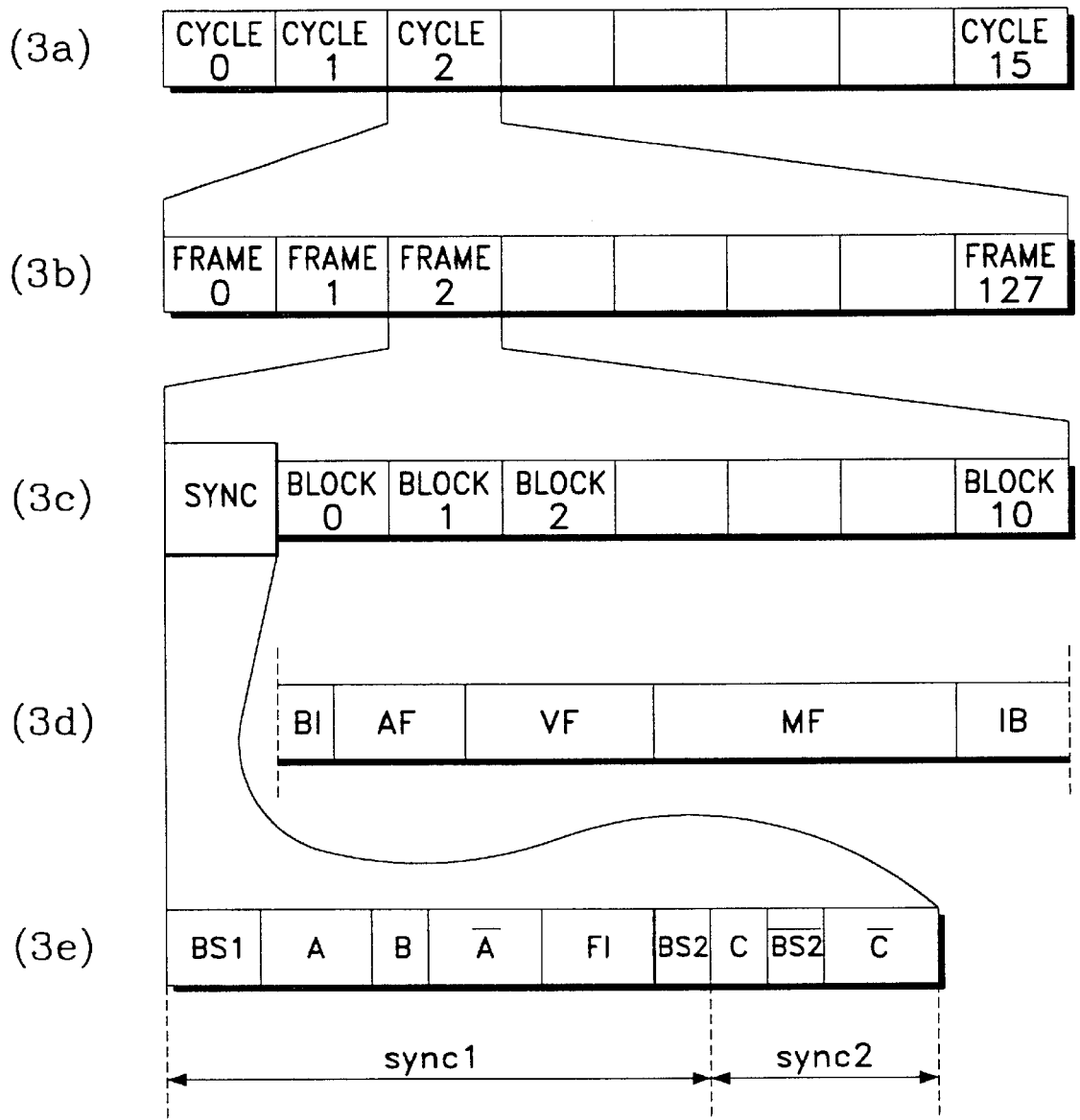
FIG. 3 is a diagram for showing a format of a high-speed radio paging code for use in the radio paging system of FIG. 2.

Referring to FIG. 3, there is illustrated a format of the high-speed radio paging code for use in the radio paging system of FIG. 2. Unlike the POCSAG code, the high-speed radio paging code is continuously transmitted in the air 24 hours a day. As illustrated in (3a) of FIG. 3, a high-speed radio paging code includes sixteen cycles and it takes exactly one hour to receive/transmit sixteen cycles of data. Further, as shown in (3b) of FIG. 3, each cycle includes 128 frames. It takes four minutes to receive/transmit one frame of data. One radio paging receiver consists of one frame assigned thereto. Each radio paging receiver checks whether or not there is self data in the frame assigned to itself. As shown in (3c) of FIG. 3, each frame includes synchronization signal SYNC and eleven blocks BLOCK0-BLOCK10. Each block represents unit data that is transferred for a predetermined time. The radio paging receiver synchronizes with the synchronization signal every four minutes. An actual transmission format of the blocks BLOCK0-BLOCK10 is represented by (3d) of FIG. 3, in which block information BI for all the blocks BLOCK0-BLOCK10 comes first, and address field AF including addresses of the blocks BLOCK0-BLOCK10 comes next. The block information BI may include the cycle and frame information, boundary information of an area, area information (in case of a broad-area service), and so forth. The boundary is determined by the number of the addresses. That is, if there are many addresses, the boundary goes back, and if there are a few addresses, the boundary goes forth. For example, if the second frame FRAME2 has five radio paging subscribers being subject thereto, the address field AF will include all addresses for the five subscribers. Thus, the radio paging receiver searches the address field AF for a self address. As the result of the address field search, if the self address is not found, the radio paging receiver will search a next assigned frame. In the meantime, if the self address is found, the radio paging receiver will search a vector field VF corresponding to the address field AF. The vector field VF informs a message position at which the corresponding radio paging subscriber can find a message. The vector field VF is classified into a numeric vector, an alphanumeric vector, and a hexa/binary vector according to the types of the information. If the paging receiver finds its own address in the address field AF, the radio paging receiver checks the hexa/binary vector in the vector field VF to determine the type and beginning position of the information. If the information type is determined as hexa/binary information, it will be judged that the information is the facsimile data.

After the vector field VF, a message field MF and an idle block IB are sequentially transmitted. The idle bock IB is assigned to a remaining time due to lack of the radio paging subscribers. (3e) of FIG. 3 represents a detailed synchronization signal which is divided into a first synchronization SYNC1 and a second synchronization SYNC2. The former represents a bit-per-second (bps) level and is a two-level synchronization being always at 1600 bps. The latter which is a two-level or four-level synchronization rechecks contents of the first synchronization SYNC1. A first synchronization word BS1 is a preamble which represents a beginning of the frame. Further, the synchronization SYNC includes a second synchronization word A, a fourth synchronization word $\overline{A}$ (i.e., a reverse synchronization word of the second synchronization word A), a third synchronization word B, a fifth synchronization word FI, a sixth synchronization word BS2, an eighth synchronization word $\overline{BS2}$ (i.e., a reverse synchronization word of the sixth synchronization word BS2), a seventh synchronization word C, and a ninth synchronization word $\overline{C}$ (i.e., a reverse synchronization word of the seventh synchronization word C).

Figure 4:
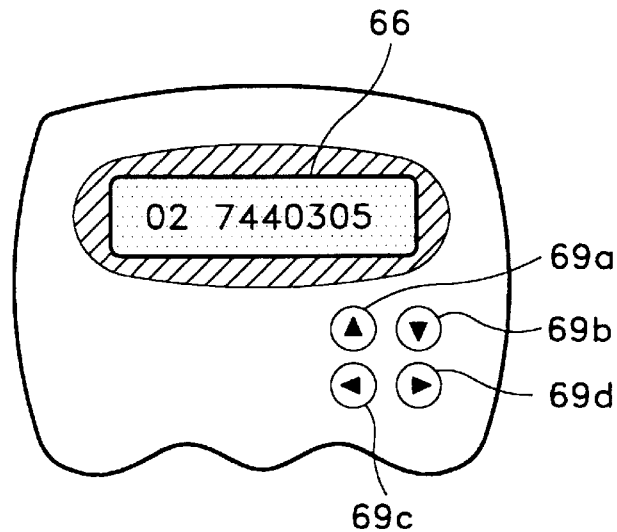
FIG. 4 is a front view of a radio paging receiver according to an embodiment of the present invention.

Referring to FIG. 4, the radio paging receiver according to the present invention includes a display 66, an up-key 69a, a down-key 69b, a left-key 69c, and a right-key 69d.

Figure 5:
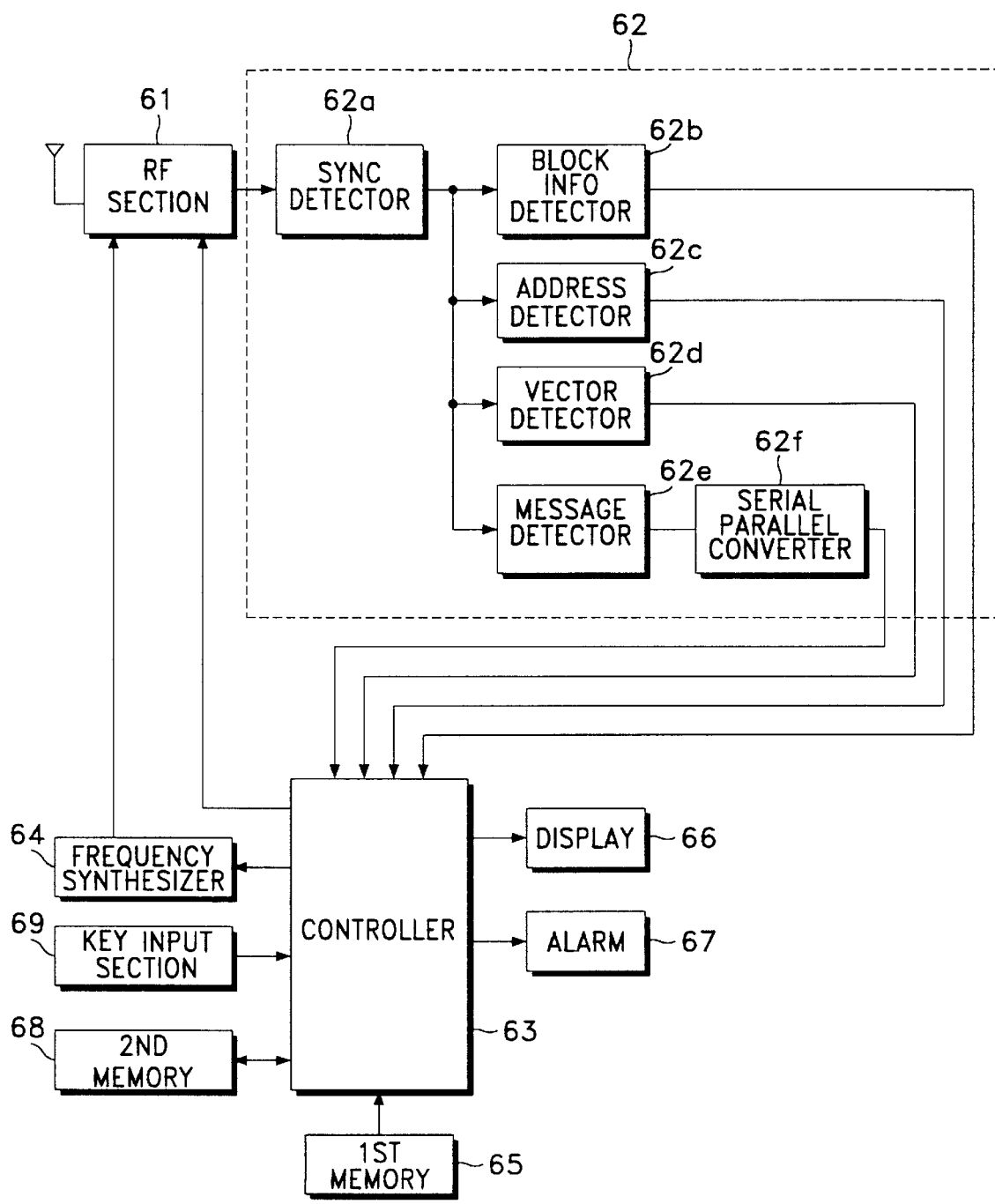
FIG. 5 is a detailed block diagram of the radio paging receiver of FIG. 4.

Referring to FIG. 5, there is illustrated a detailed block diagram of the radio paging receiver of FIG. 4. A key input section 69 includes a plurality of keys with which the user may input paging information to generate various control signals for the radio paging receiver. The key input section 69 includes a power switch for turning on/off the radio paging receiver, a scan key for scanning channels in a channel scan mode, and a read key for reading a reception message stored in a memory, in addition to the direction keys 69a, 69b, 69c, and 69d shown in FIG. 4. A radio frequency (RF) section 61 amplifies a weak RF signal received from the base station 50 via an antenna, and shifts a frequency band of the amplified RF signal into an original signal band. Further, the RF section 61 demodulates the frequency-converted RF signal and converts the demodulation signal into digital data. A code detector 62 includes a synchronization detector 62a, a block information detector 62b, an address detector 62c, a vector detector 62d, and a message detector 62e to detect codes of various kinds from the digital code data generated from the RF section 61 based on the code format of FIG. 3. The code detector 62 further includes a serial-to-parallel converter 62f for converting a serial message generated from the message detector 62e into 8-bit parallel data. A first memory 65 stores radio paging receiver information such as a CAP (Code Assignment Plan) code, reference channel frequencies for setting service area channels, and service channel frequencies for receiving a radio paging service at the service area set by the reference channel frequencies. The first memory 65 preferably stores up to four CAP codes in case of POCSAG, and up to sixteen CAP codes in case of the high-speed protocol. Thus, it is possible to properly use the CAP codes based upon operation modes, for example, message transmission/reception, file transmission via a mode, or data transmission/reception via facsimile, etc. The first memory 65 can be a RAM, ROM but it is preferable to use an EEPROM. A controller 63 analyzes the information stored in the first memory 65 to control a paging service for the radio paging receiver and a function of receiving and displaying the facsimile data. According to an illustrative embodiment of the present invention, the controller 63 sequentially selects the reference channel frequencies stored in the first memory 65, generates the selected reference channel frequencies with a particular period to designate the channel, and checks the existence of data from the designated channel. If the data is received, the controller 63 analyzes the area information included in the CAP code to check the area at which the radio paging receiver is currently located, and generates the service channel frequency for the corresponding service area to analyze the frame data received from the designated service channel. Further, the controller 63 controls an overall operation of the radio paging receiver.

A frequency synthesizer 64 designates a channel of the RF section 61 according to channel data output from the controller 63. The channel data includes the reference channel frequencies for designating the reference channel frequency for the service area, and the service channel frequencies for the radio paging service of the broad-area service subscriber. A display 66 displays various kinds of operating situations, the received paging messages, and the received facsimile data, under the control of the controller 63. The display 66 is preferably a LCD (Liquid Crystal Display). An alarm 67 generates an alarm signal for informing a reception of the paging message and the facsimile data, under the control of the controller 63. The alarm 67 includes a tone generator and a vibrator. A second memory 68 stores the received facsimile data by the line unit.

Figure 6:
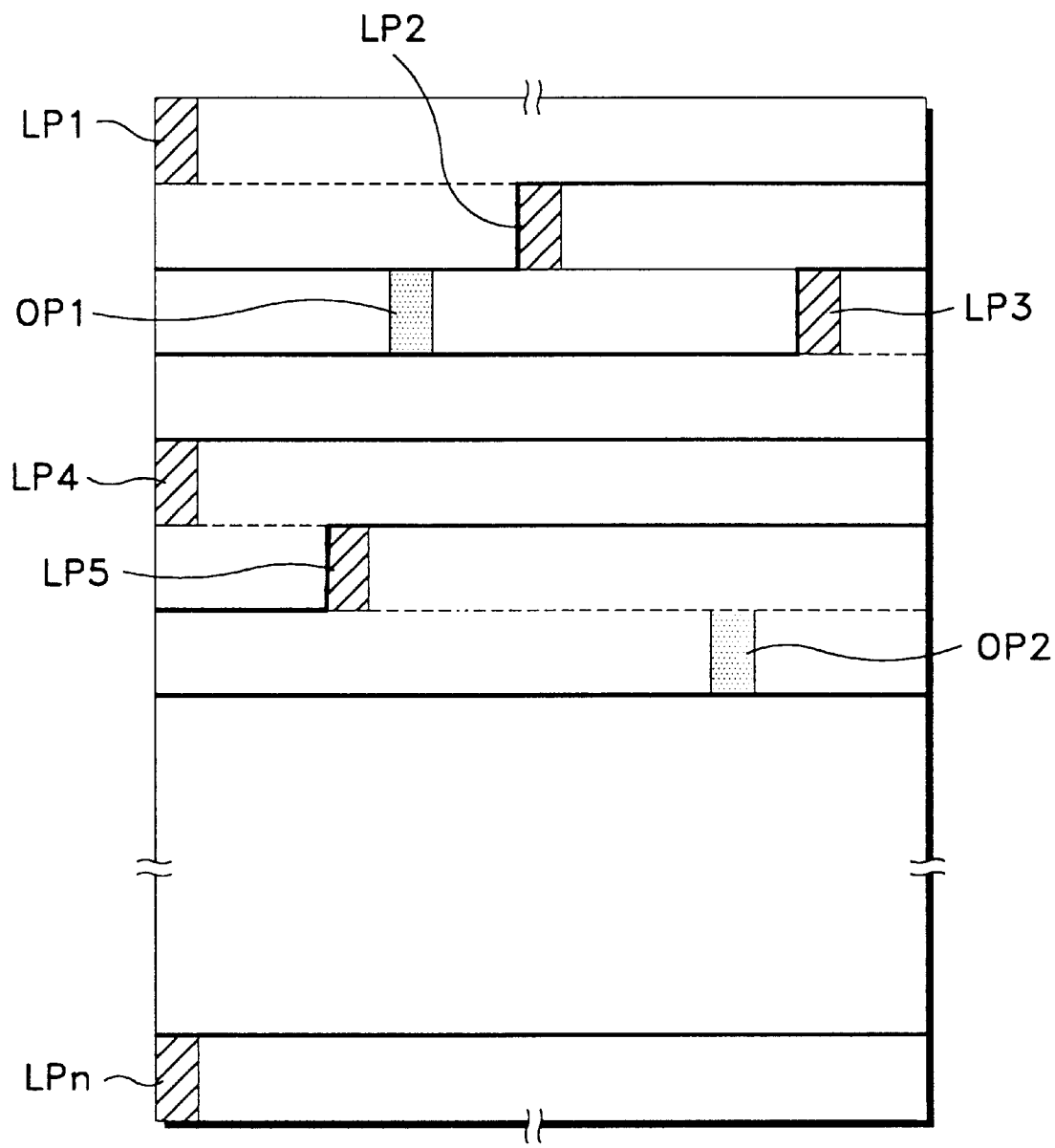
FIG. 6 is a diagram for showing a memory configuration according to an embodiment of the present invention.

Referring to FIG. 6, there is illustrated a configuration of the second memory 68, which includes a plurality of line pointers LP1-LPn for pointing to beginnings of respective lines, each line having different amounts of data, and first and second output pointers OP1 and OP2 for pointing to an area in which the data stored in the second memory 68 is to be displayed on the display 66.

Figure 7:
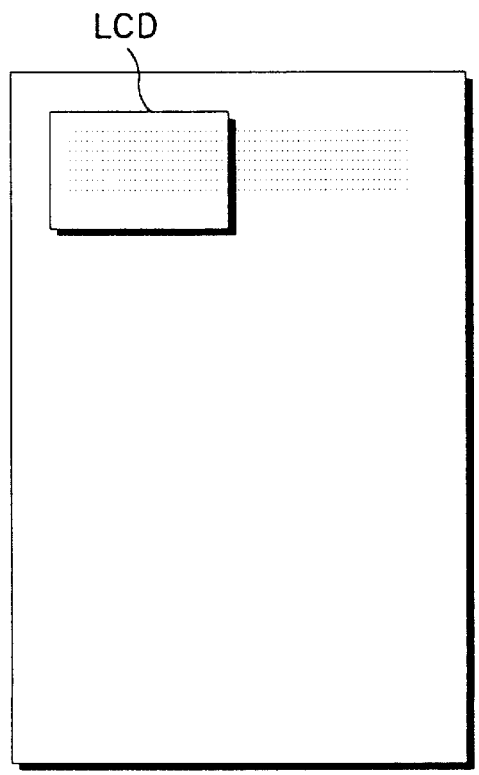
FIG. 7 is a diagram for showing a display format of facsimile data on an LCD in comparison with an A4 sheet.

Referring to FIG. 7, there is illustrated a display format of the facsimile data on the LCD in comparison with an A4 sheet. In general, the facsimile compresses an image data by a modified Huffman coding, when sending the image data, i.e., the facsimile data. At the called facsimile end, the compressed image data is decompressed at the called facsimile to restore it to the original image data. Huffman coding is well known and is based on an image having repetitive basic patterns. Thus, the image is first classified into the basic patterns, and then rearranged in the order of occurring frequency of the classified basic patterns. The higher the occurring frequency, the shorter the identification code is assigned. Such compressed data is decompressed at the called facsimile end based on a data compression dictionary that the calling facsimile has used in the course of compressing the data to restore it to the original image data. CCITT (Comite Consultatif International Telegraphique et Telephonique) Recommendation defines the data compression dictionary in the light of G3 Standard. In accordance with CCITT Recommendation, the data compression dictionary is edited in the order of occurring frequency of the patterns (i.e., the repetitive number of black and white dots), as shown in the following table.

<TABLE>

| Rep. No. | White | Black |
|---|---|---|
| 0 | 00110101 | 0000110111 |
| 1 | 000111 | 010 |
| 2 | 0111 | 11 |
| 3 | 1000 | 10 |
| . | . | . |
| . | . | . |
| . | . | . |
| 2560 | 000000011111 | 000000011111 |
| EOL | 000000000001 | 0000000000001 |

The values listed in the Table are defined by CCITT Recommendation. Therefore, if the calling facsimile sends the repetition numbers only, the called facsimile will print black and white dots according to the repetition numbers received to restore the original image. G3 Standard specified in CCITT Recommendation is based on an A4 sheet. Thus, the facsimile transmits and receives the facsimile data on the basis of the A4 sheet. To fascilitate the display of the facsimile data on a non-A4 size display, such as the LCD of the radio paging receiver, the received facsimile data is sectionally displayed on the LCD. The radio paging receiver according to the present invention preferably employs a scrolling display function to display the equivalent of a full A4 sheet by using controls such as up-key 69a, down-key 69b, left-key 69c, and right-key 69d. The data displayed on the LCD will be moved (or scrolled) by a predetermined distance whenever depressing the scroll keys one time. Accordingly, upon depressing the direction keys, the radio paging receiver calculates a position to move and reads the data corresponding to the calculated position to display on the LCD. The scrolling distance by each key depression is variable according to how many letters the LCD can display. For example, if the LCD displays a small number of letters, the scrolling distance by each key depression will be longer.

Figure 8:
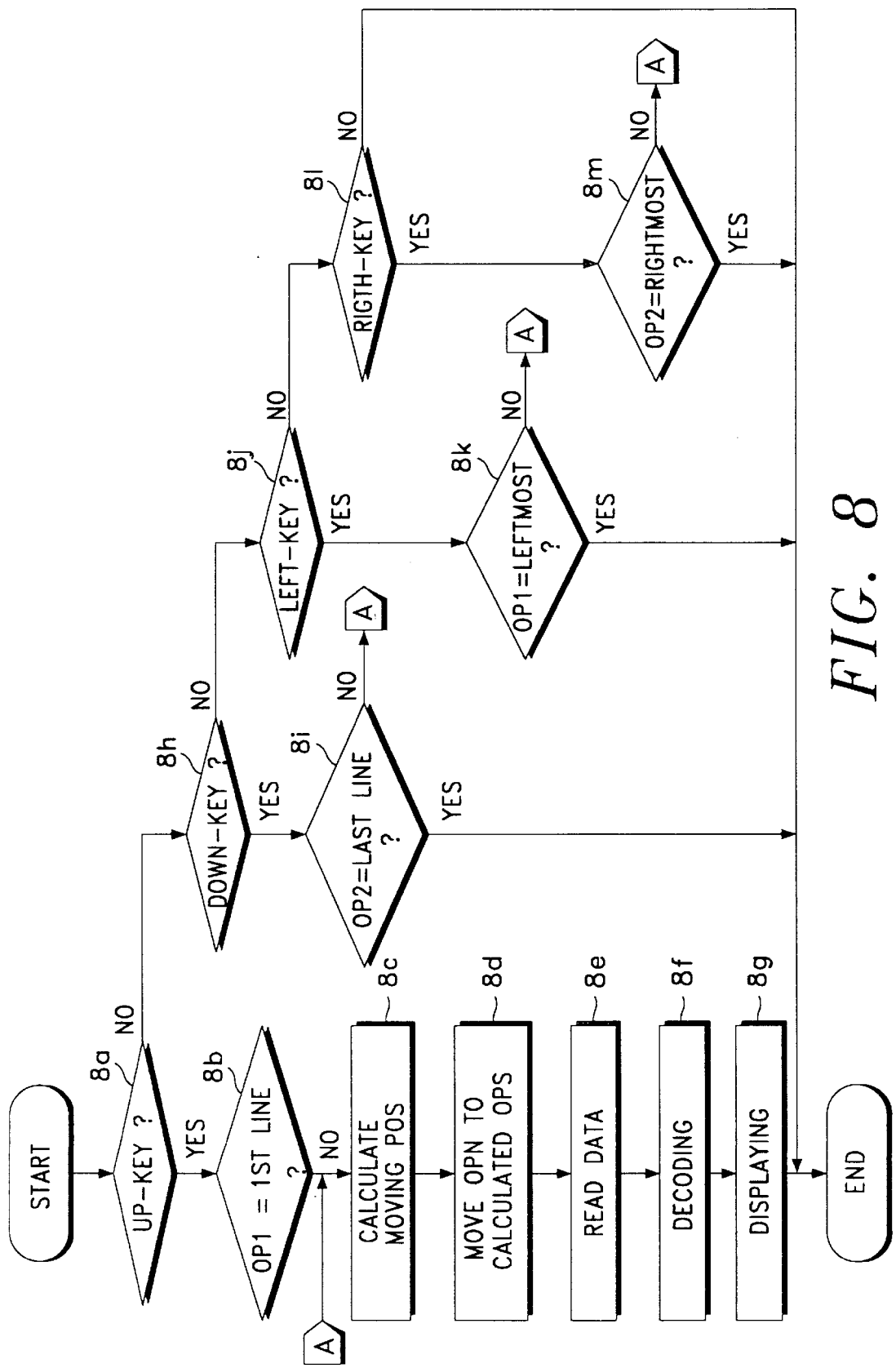
FIG. 8 is a flow chart for scrolling an LCD screen according to an embodiment of the present invention.

FIG. 8 shows an illustrative flow chart for scrolling the facsimile data displayed on the LCD according to an embodiment of the present invention. The controller 63 checks, at step 8a, whether or not the up-key 69a is depressed. If the up-key 69a is depressed, the controller 63 will check, at step 8b, whether or not the first output pointer OP1 points to a first line. If the first output pointer OP1 does not point to the first line, the controller 63 calculates a position to move at step 8c. The controller 63 moves the first and second output pointers OP1 and OP2 to the calculated position at step 8d, and reads the facsimile data corresponding to the moved position at step 8e. The decoder 62 decodes the read data to restore it to the original image data at step 8f, under the control of the controller 63. Then, the controller 63 displays the restored image data on the display 66 at step 8g.

In the meantime, if the up-key 69a is not depressed at step 8a, it is checked at step 8h whether or not the down-key 69b is depressed. If the down-key 69b is depressed, the controller checks, at step 8i, whether or not the second output pointer OP2 points to the last line. If the second output pointer OP2 does not point to the last line, the procedure goes to step 8c and executes step 8c and its succeeding steps 8d to 8g to scroll the data displayed on the display 66 in a down direction. However, if the down-key 69b is not depressed at step 8h, it is checked at step 8j whether or not the left-key 69c is depressed. If the left-key 69c is depressed, it is checked at step 8k whether or not the first output pointer OP1 points to the leftmost end of the line. If the first output pointer OP1 does not point to the leftmost end of the line, the procedure goes to step 8c and executes the step 8c and its succeeding steps 8d to 8g to scroll the data displayed on the display 66 in the left direction. However, if the left-key 69c is not depressed at step 8j, it is checked at step 8l whether or not the right-key 69d is depressed. If the right-key 69d is depressed, it is checked at step 8m whether or not the second output pointer OP2 points the rightmost end of the line. If the second output pointer OP2 does not point the rightmost end of the line, the procedure goes to step 8c and executes step 8c and its succeeding steps 8d to 8g to scroll the data displayed on the display 66 in the right direction.

As described in the foregoing, the radio paging receiver of the invention can receive the facsimile data. Therefore, the user can receive the facsimile data even at a place where there is no facsimile machine installed, or while travelling from place to place.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. In a radio paging system having a base station connected to a Public Switching Telephone Network (PSTN), and a plurality of radio paging receivers, said base station broadcasting a signal which is received by the radio paging receivers, said signal being broken down into sections and having address fields for addressing particular sections to individual radio paging receivers, a hand-held radio paging receiver capable of receiving facsimile data, comprising:

a code detector for detecting a synchronization signal, block information, an address signal, a vector field for determining the type and beginning position of a particular section addressed to an individual radio paging receiver, and a message from a received radio paging signal;

a memory for storing image data;

a display suitable for a hand-held device for displaying the image data stored in said memory;

means for scrolling the image data displayed on the display; and a controller for receiving the synchronization signal, the block information, the address signal, the vector data, and the message, checking a type of the message to store the image data if the message is the image data, calculating a moving position of first and second output pointers in response to signal input from said scrolling means, said first output pointer pointing to a location in said memory of the uppermost and leftmost position of the portion of the image data on the display, said second output pointer pointing to a location in memory of the lowest and rightmost position of the portion of the image data on the display, and reading the image data corresponding to the calculated moving position to display the read image data on display.

2. The radio paging receiver capable of receiving facsimile data according to claim 1, wherein said scrolling means comprises an up-key, a down-key, a left-key, and a right-key, wherein said controller calculates the position which moves by a predetermined distance whenever depressing each of said up-key, down-key, left-key, and right-key.

3. The radio paging receiver capable of receiving facsimile data according to claim 1, further comprising a plurality of line pointers for pointing to a beginning of a line and to divide the image data stored in the memory by a line unit.

4. The radio paging receiver according to claim 3, further comprising: an additional memory, said additional memory storing radio paging receiver information, such as a Code Assignment Plan (CAP) code, reference channel frequencies for setting service area channels, and service channel frequencies for receiving a radio paging service at the service area set by the reference channel frequencies.

5. The radio paging receiver according to claim 1, wherein the code detector comprises:

a synchronization signal detector;

a block information detector;

an address detector;

a vector detector;

a message detector; and a serial-to-parallel converter.

6. The radio paging receiver capable of receiving facsimile data according to claim 1, wherein the display for displaying image data stored in said memory further displays various kinds of operating conditions and received paging messages.

7. The radio paging receiver according to claim 1, wherein the radio paging system uses high-speed radio paging code, said high-speed radio paging code being continuously transmitted 24 hours a day and comprising:

at least one cycle per hour;

at least one frame per cycle;

at least one block and at least one said synchronization signal per frame;

wherein each of at least one frame contains at least one said block information field, at least one said address field, at least one said vector data field, and at least one said message field; and wherein said block information comprises cycle and frame information, boundary information of an area, and area information.

8. The radio paging receiver according to claim 1, wherein said vector data is classified into a numeric vector, an alphanumeric vector, and a hexa/binary vector to determine a type and beginning position of transmitted information.

9. In a radio paging system having a base station connected to a Public Switching Telephone Network (PSTN), and a plurality of radio paging receivers, said base station broadcasting a signal which is received by the radio paging receivers, said signal being broken down into sections and having address fields for addressing particular sections to individual radio paging receivers, a hand-held radio paging receiver capable of receiving facsimile data, comprising:

a code detector for detecting a coded signal received from an antenna, said coded signal includes a synchronization signal, block information, fields for addresses and vectors, messages, and said facsimile data, said vector field for determining the type and beginning position of a particular section addressed to an individual radio paging receiver;

means for converting said facsimile data to image data;

a display for displaying the image data;

a key input device including an up-key, a left-key, and a right-key for scrolling the image data displayed on the display;

a plurality of line pointers for pointing to a beginning of a line to divide the image data;

first and second output pointers for pointing to an output position of image data, said first output pointer pointing to a location in said memory of the uppermost and leftmost position of the portion of the image data on the display, said second output pointer pointing to a location in memory of the lowest and rightmost position of the portion of the image data on the display; and a controller for processing the coded signal and the image data and for calculating a moving position of first and second output pointers in response to a key input from said key input device, and reading the image data pointed by said first and second output pointers to display the read image data on the display.

10. The radio paging receiver capable of receiving facsimile data according to claim 9, wherein said display is a liquid crystal display.

11. The radio paging receiver capable of receiving facsimile data according to claim 9, further including a memory for storing said image data.

12. In a radio paging system having a base station connected to a Public Switching Telephone Network (PSTN), and a plurality of radio paging receivers, said base station broadcasting a signal which is received by the radio paging receivers, said signal being broken down into sections, said sections containing information addressed to individual radio paging receivers, a method for receiving facsimile data via a radio paging receiver including a memory for storing received image data by a line unit, a key input device for generating position movement key data, and a display for displaying the image data, comprising the steps of:

i) checking whether or not the position movement key data is received;

ii) checking whether or not the image data displayed on the display is a first line, in response to an up-key data input;

iii) checking whether or not the image data displayed on the display is a last line, in response to a down-key data input;

iv) checking whether or not the image data displayed on the display is a leftmost end of a line, in response to a left-key data input;

v) checking whether or not the image data displayed on the display is a rightmost end of a line, in response to a right-key data input; and vi) calculating a data output position according to the checking results and the position movement key data of said second through fifth steps, and reading the image data at the calculated position of the memory to display the read image data on a display.

13. The method according to claim 12, wherein said checking steps are performed using line pointers for pointing to a memory location of a beginning of a line of the stored image data, and output pointers to point to memory locations of the uppermost and rightmost position and lowest and leftmost position currently shown on the display.

* * * * *